March 8, 1960 A. W. BLOW ET AL 2,927,970

IMPROVED SELECTOR PER STATION TELEPHONE SYSTEM

Filed Nov. 25, 1953 4 Sheets-Sheet 1

INVENTORS.
ANGUS W. BLOW
ADOLPH A. BAKER, JR.
BY [signature]
THEIR AGENT

IMPROVED SELECTOR PER STATION TELEPHONE SYSTEM

Filed Nov. 25, 1953 4 Sheets-Sheet 2

IMPROVED SELECTOR PER STATION TELEPHONE SYSTEM

Filed Nov. 25, 1953 4 Sheets-Sheet 3

United States Patent Office 2,927,970

Patented Mar. 8, 1960

2,927,970

IMPROVED SELECTOR PER STATION TELEPHONE SYSTEM

Angus W. Blow and Adolph A. Baker, Jr., Rochester, N.Y., assignors, by mesne assignments, to General Dynamics Corporation, a corporation of Delaware Application November 25, 1953, Serial No. 394,413

26 Claims. (Cl. 179—18)

Figure 2:
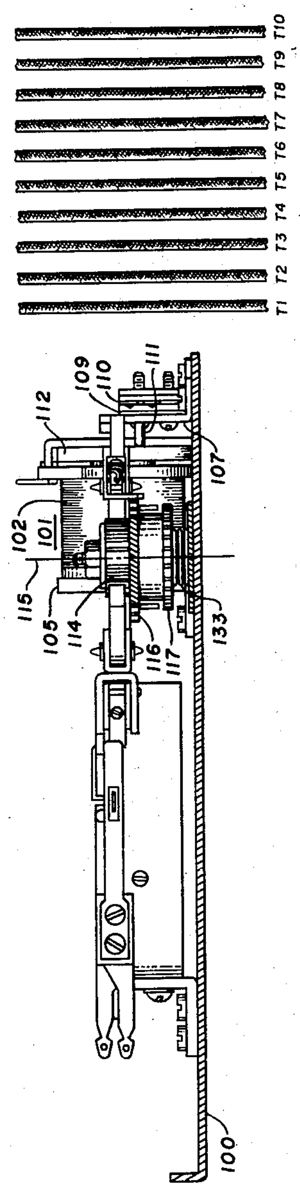

Our invention relates to automatic telephone systems, and more particularly to a telephone system of the so-called "100% trunking" or "selector-per-station" type.

Selector-per-station telephone systems are those which have a selector permanently assigned to each line in the system. The selective switch means, or selector switch, of the selector has both fixed and movable contacts, the former being accessible to the latter. The fixed contacts are respectively connected to the fixed contacts of the other selectors in the system. Thus, each station can initiate a call to any other station in the system through the selector permanently assigned to the calling station.

The advantage of the selector-per-station is that there is no sharing of equipment, and consequently an "all equipment busy" condition is never encountered. For this reason, the number of simultaneous conversations which can take place is not limited as it is in a link-type system which employs shared equipment. The selectors are the only automatic equipment involved. While there are more selectors than there are pieces of switch equipment in a link-type system, servicing is considerably less complicated. It is necessary only to know how one selector operates to understand the operation of the entire system.

"Selector-per-station" telephone systems have been and are in production and on sale. These systems in general employ a single-motion switch means in order to limit the cost of the system. Because all stations in the system must be accessible to each selector, the number of stations which can be accommodated in a system of this type is limited. It is common with single motion switches to employ additive dialing; that is, the dialing of subsequent digits merely causes the movable contacts of a given switch means, or selector switch, to continue its travel from the point at which it rested after the previous digit. Thus, stations 1 to 9 may be reached by dialing a single digit; those from 10 to 19 by dialing two digits; those from 20 to 29, by dialing three digits; from 30 to 39, four digits. Since telephone numbers larger than four digits are difficult to remember and take a long time to dial, the capacity of a system of this type is generally limited to about forty stations.

Telephone systems employing the selector-per-station principle and single motion switches with additive dialing have been generally open to the objection that after the called station is dialed and no busy signal is encountered, ringing must be initiated at the called station by depressing a pushbutton or other switch means at the calling station. This is time-consuming, and since the operation is different from that of conventional city, or what may be otherwise spoken of as public utility, telephones, some difficulty may be encountered by the uninitiated in completing a call.

It is accordingly an object of our invention to provide a new telephone system of the selector-per-station type.

It is also an object of our invention to provide a new telephone system of the selector-per-station type which provides automatic ringing upon completion of the dialing of the called station, if the called station happens to be idle.

It is a further object of our invention to provide a low cost selector-per-station type of telephone system which is reliable and easy to service.

It is a further object of our invention to provide a new type of selector-per-station telephone system which provides automatic ringing and common conference facilities.

It is yet another object of our invention to provide a new selector-per-station telephone system with automatic ringing and a progressive conference facility.

It is yet another object of our invention to provide a selector-per-station type of telephone system which has automatic ringing and which also provides executive right-of-way.

It is yet another object of our invention to provide a new selector-per-station type of telephone system in which ringing will automatically occur at a called station where the called station hangs up after a conversation with a third party.

Further objects and advantages of our invention will become apparent as the following description proceeds and the features of novelty which characterize our invention will be pointed out with particularity in the claims annexed to and forming a part of this specification.

Figure 1:
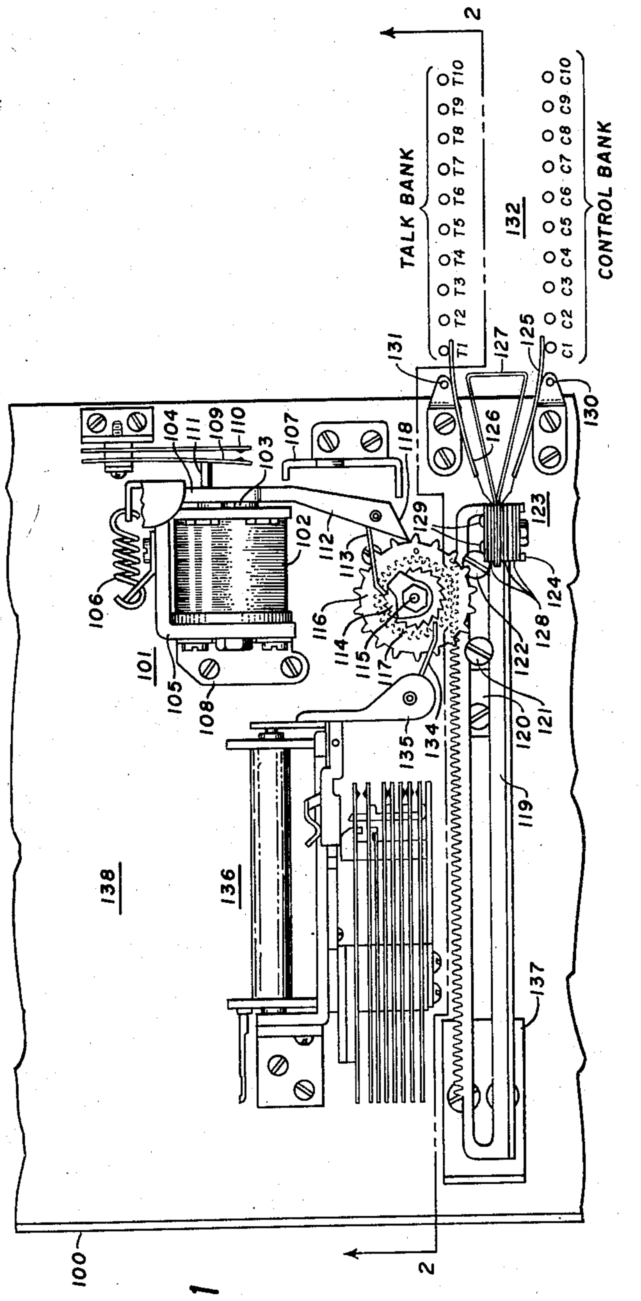
Figure 3:
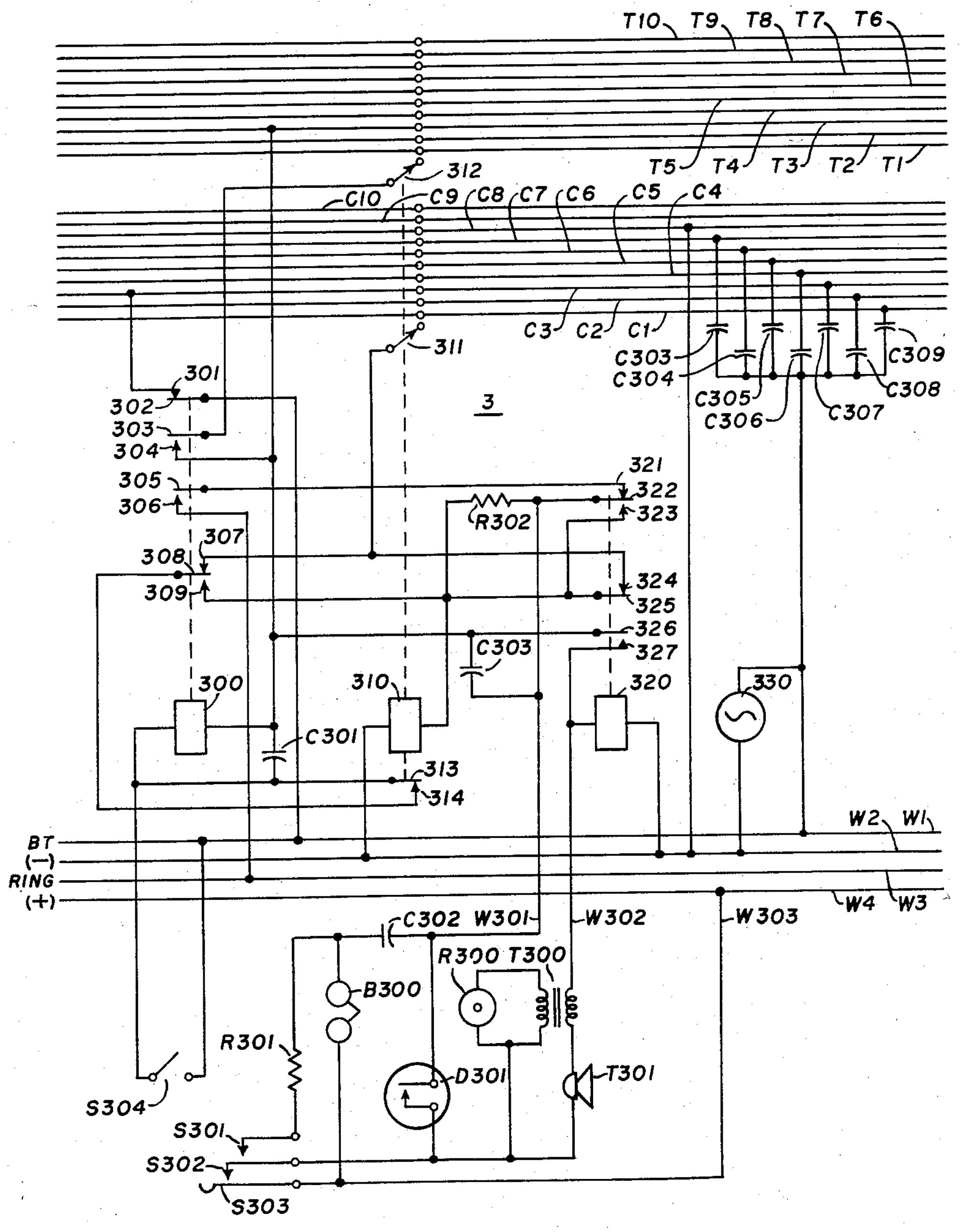
Figure 4:
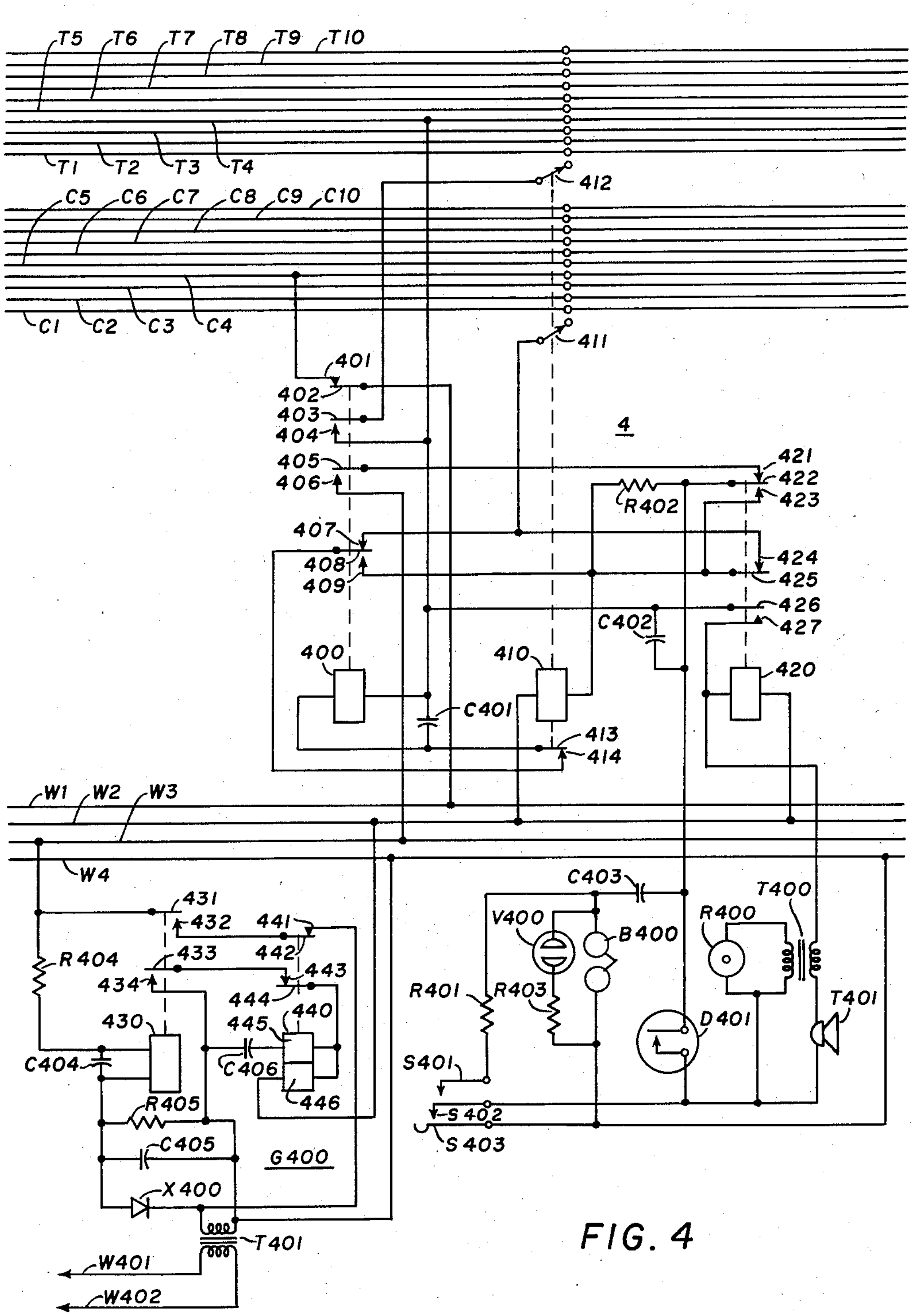
Figure 5:
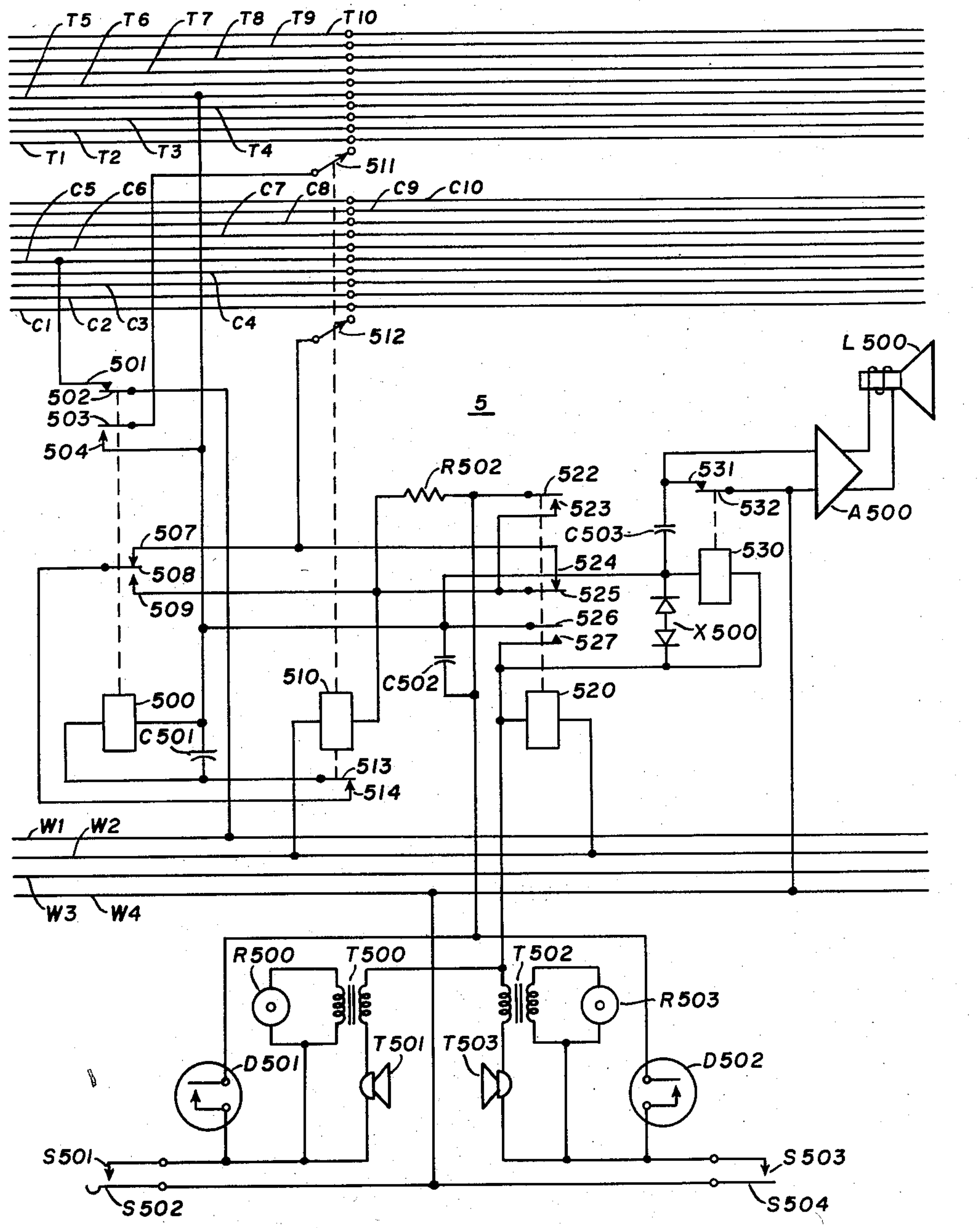

For a better understanding of our invention, reference may be had to the accompanying drawing in which Fig. 1 is a plan view of a selector switch which is advantageous in carrying out our invention;

Fig. 2 is a sectional view taken along line 2—2 of the switch shown in Fig. 1; and Figs. 3, 4 and 5, when laid side by side in ascending numerical order from left to right with corresponding lines in alignment, show a schematic circuit diagram of a preferred embodiment of our invention.

In this specification, a block of reference numerals has been reserved for each figure, with the initial digit of each reference numeral being the number of the figure to which it is assigned. Thus, reference numerals 100–199 are assigned to Fig. 1, 200–299 to Fig. 2, etc. The system enables the reader, when he sees a given reference numeral in the text, to go directly to the particular figure in the drawings where the numeral first appears.

*Description of selector switch*

Our invention is particularly advantageous in that only three magnetic devices are necessary per selector, and that none of them require marginal operation. Two of these devices have a dual function: that of acting as a prime mover or mechanical holding means and that of functioning as a relay. An explanation of a suitable switch of this type is necessary to an understanding of our invention, and we have therefore shown a preferred embodiment of such a switch in Figs. 1 and 2.

As shown in these figures, there is mounted on plate 100 a step magnet 101 having a winding 102 around a core of which only pole face 103 is visible. Step magnet 101 has an armature 104 and a yoke 105. The armature is shown energized, but when deenergized is held in its open position by spring 106. Stop 107 may be used to prevent armature 104 from travelling too far away from pole face 103. The magnet may be supported in suitable fashion, as by bracket 108. Contact springs 109 and 110 are actuated by armature 104 through a suitable medium, such as insulating actuating rod 111.

The outer end 112 of armature 104 carries pusher arm 113. Arm 113 engages ratchet gear 114, so that each actuation of step magnet 101 causes arm 113 to rotate ratchet gear 114 around its central axis 115. Attached for rotation around axis 115 with ratchet gear 114 are sprocket 116 and a drive gear 117. A protruding portion 118 of end 112 of armature 104 is arranged to engage the teeth of sprocket 116 when in the actuated position of step magnet 101; this prevents arm 113 from rotating ratchet 114 more than one step.

As drive gear 117 is rotated through the medium of magnet 101, it drives rack 119 in a linear direction. Rack 119 may be kept on its linear course by cut-out portion 120, the edges of which surround suitable guiding means, such as screws 121 and 122.

Rack 119 carries contact spring assembly 123, thereby forming movable contacts. Assembly 123 comprises mounting bracket 124, contact springs 125 and 126, travel restrainer 127, insulators 128 and rivets 129 which may be used to secure contact springs 125 and 126, together with travel restrainer 127, to bracket 124.

Contact springs 125 and 126 are shown in the unactuated, or "home," position, where they are restrained from divergent movement by means of stops 130 and 131, respectively. When driven outward, i.e., away from the home position, springs 125 and 126 are arranged to contact fixed contacts, preferably individual wires of a wire bank multiple 132. The contact wires engaged by what we term spring, or wiper 126, designated T1 to T10, we term talk members, or "talk bank" conductors, while those engaged by spring, or wiper 125, designated C1 to C10, we term control members, or "control bank" conductors.

In accordance with our invention, there may be as many conductors in the wire bank multiple 132 as the movement of rack 119 will accommodate. As pointed out earlier, the practical number of lines in a system of this type is usually on the order of 40 conductors. Rack 119 may therefore be given a length to accommodate travel past this number of conductors in wire bank multiple 132. To conserve space, we have illustrated only 10 lines. The wire bank multiple is advantageous because it may extend upward or downward for engagement by the others of similar switches placed above or below the one shown.

In accordance with our invention, the switch directing means, or dial, providing driving pulses for step magnet 101 is normally open, that is, its contacts are open when it rests. Step magnet 101 is driven by current pulses controlled by the dial, instead of responding to breaks in current as in conventional telephone practice. Restoring force for the selective switch means is furnished by spring 133 which engages the unitary assembly of ratchet 114, sprocket 116 and drive gear 117 at its upper end and mounting plate 100 at its lower end. Spring 133 would normally cause contacts 125 and 126 to restore, i.e., return to the home position at the conclusion of each dial pulse, the restoring force being transmitted to rack 119 by drive gear 117. Consequently, there must be some means of preventing this return until a connection established through contact springs 125 and 126 is no longer needed.

To provide a holding force for rack 119, we prefer to employ a restraining arm 134 which is carried by armature 135 of magnet 136. Arm 134 positively engages a tooth of ratchet 114 whenever magnet 136 is actuated. According to our invention, we arrange for magnet 136 to be actuated during the time ringing, busy or talking connections are established between the station individual to the selector switch shown and another station. The remaining parts of magnet 136 form the parts of a conventional telephone-type relay, and it is therefore felt to be unnecessary to point them out in particular. The connections we prefer to employ for relay 136 are described below in connection with the circuit diagrams, Figs. 3–5.

Bracket 137 may be employed as a backstop for rack 119 to prevent the rack from returning beyond the home position shown. As will also be pointed out below, a third relay is provided for each selector in accordance with our invention. The area 138 may be used as a convenient place to mount the third relay, but it has been felt to be unnecessary to show this relay, since its appearance forms no part of our invention.

*Description of circuit*

Figs. 3, 4 and 5 each show a substation circuit suitable for use with our invention, together with selector switch means individual thereto. Each of the substations comprises the same basic elements as the others, but each is illustrated as having an accessory feature usable in accordance with our invention. Thus, for example, the substation of Fig. 3 has a transmitter (T301), a receiver (R300), an induction coil (T300), and a dial (D301). This substation also has a ringer (B300) and a ringing capacitor (C302). Springs S301, S302 and S303 are hookswitch springs which are brought into contact with each other when receiver R300 is removed from the hook.

In the case of the substation of Fig. 3, a resistor R301 is included in the substation, and a pushbutton switch S304 controls an optional feature known as executive right-of-way. The latter may be closed at the option of the user when he dials a number and finds it busy. Closing of S304 causes a busy tone to sound momentarily in the receivers of the conversing parties, after which the calling party is cut through to the established connection.

Conductors W301, W302 and W303 connect the substation of Fig. 3 to its associated connector. As explained above, the connector comprises three magnetic devices: step magnet 310, hold magnet 320 and a third magnet 300, which we term a connect magnet. (Magnet 300 is the magnet which may be mounted in space 138 on plate 100, if desired.) The linearly-moving contact springs of the step magnet are designated as 311 and 312 (shown as 125 and 126 in the example of Fig. 1) while the corresponding wire bank multiple contacts are indicated by small circles on lines T1–T10 and C1–C10. Again, only 10 lines have been illustrated as in the cases of Figs. 1 and 2, though it will be understood by those skilled in the art that a greater or lesser number may be employed in accordance with our invention.

Also shown in Fig. 3 is a busy tone generator 330 which may be of any conventional type, together with feed capacitors C303–C309.

The substation of Fig. 4 is similar to that shown in Fig. 3 except that optional neon lamp V400 and its associated current limiting resistor R403 have been added. This lamp provides a visual signal in addition to the audible signal provided by ringer B400. Such a signal is helpful if a telephone system according to our invention is installed where ordinary or city telephones are also present. The flashing lamp indicates to the user which telephone is ringing.

Also shown in Fig. 4 is the ringing generator, indicated generally as G400, which is common to the system. The operation of this generator will be explained below.

In Fig. 5 is shown a party line having two substations thereon, each of these substations being without a ringer. This line is shown as being provided with a voice paging system comprising a relay (530), an amplifier (A500) and a loudspeaker (L500), together with a capacitor (C503) and a surge damper (X500). In operation, a person calling the line shown in Fig. 5 hears no ringback tone and consequently knows that he has dialed into a voice paging line. He thereupon announces the name of the person to whom he wishes to talk, his words being repeated over loudspeaker L500. When the page is answered, the loudspeaker and amplifier are automatically disconnected from the transmitter of the calling party, and the conversation may take place in the normal manner.

*Description of normal call*

Assume that station 3 (Fig. 3) wishes to direct a connection, i.e., call, station 4 (Fig. 4). Upon initiation of the call by removal of the receiver at station 3 from its hook, hookswitch contacts S301, S302 and S303 are closed. Hold relay 320 then operates over a circuit extending from (−), winding of relay 320, primary of transformer T300, transmitter T301, contacts S302 and S303 to (+).

The operation of relay 320 prepares a circuit for switch stepping magnet 310. Manipulation of dial D301 causes the stepping of magnet 310 over a circuit extending from (−), winding of stepping magnet 310, make contacts 323 and 322 of relay 320, dial D301, contacts S302 and S303 to (+). Since it is assumed that station 3 is calling station 4, four dial pulses are sent from dial D301 and therefore four steps are taken by springs 311 and 312. Resistor R301 and capacitor C302 are connected in series across dial D301 via contacts S301, S302 for surge protection of the dial contacts. Since hold relay 320 is operated, springs 311 and 312 remain on C4 and T4, respectively.

As soon as magnet 310 completes its fourth step, busy signal is supplied to station 3 over a circuit extending from (−), busy signal generator 330, capacitor C306, C4, spring 311, back contacts 307 and 308 of connect magnet 300, back contacts 314 and 313 of step magnet 310, capacitor C301, operated make contacts 326 and 327 of hold relay 320, primary of transformer T300, transmitter T301, and contacts S302 and S303 to (+). Inasmuch as receiver R300 is connected to the secondary of transformer T300, busy tone signal is heard by the calling party in receiver R300.

In the exampled embodiment of our invention, an idle station is characterized by the presence of (−) on the control bank conductor individual thereto; if busy, no D.C. potential is present on this conductor. Connect relay 300 functions as an idle test relay. Thus, if called station 4 (see Fig. 4) is idle, connect relay 300 operates over a circuit extending from (−), busy signal generator 330, conductor W1, break contacts 402 and 401 of connect relay 400, control bank conductor C4, spring 311 of stepping switch 310, back contacts 307 and 308 of connect magnet 300, break contacts 314 and 313 of stepping magnet 310, winding of magnet 300, make contacts 326 and 327 of hold magnet 320, primary of transformer T300, transmitter T301, contacts S302 and S303 to (+). Connect relay 300 operates quickly after brush 311 reaches C4 to remove busy signal from station 3. Relay 300 also opens its contacts 301, 302 to remove (−) from control conductor C3, thus marking station 3 as busy.

If called station 4 is busy, connect magnet 400 is already operated and therefore the above-traced circuit stands broken at back contacts 401 and 402. In the latter case, the idle test shows station 4 to be busy because relay 300 cannot be operated. Busy tone signal continues to reach the calling party over the above-traced circuit.

From the foregoing explanation, it is clear that no busy test in the usual sense is made according to our invention. Rather an idle, or "not busy" test is made; and if the test shows the called station is not busy, i.e., is idle, positive action (operation of the calling station's connect relay) occurs. Furthermore, the "not-busy" arrangement may include the continuous presence of busy tone on the control bank conductor (in this case C4). The capacitor is shorted out by connect magnet contacts (401, 402 in this case) when a station is idle. This situation, of course, is the inverse of the usual busy test configuration of conventional step-by-step telephone practice. There a busy test relay is operated when the called station is busy to lock out the calling line from the called line and to return busy tone to the calling station.

Proceeding now on the assumption that called station 4 is idle and that therefore connect relay 300 is operated over the above-traced circuit, connect relay 400 next operates. The circuit for this operation may be traced from (−), winding of step magnet 410, back contacts 425 and 424 of hold relay 420, back contacts 407 and 408 of connect relay 400, back contacts 414 and 413 of stepping magnet 410, winding of relay 400, talk bank conductor T4, spring 312, make contacts 303 and 304 of connect relay 300, make contacts 326 and 327 of hold magnet 320, primary of transformer T300, transmitter T301, contacts S302 and S303 to (+). Step magnet 410 is not operated at this time because its resistance is small compared to that of the winding of relay 400. The operation of connect magnet 400 causes station 4 to be marked as busy to other stations through removal of (−) potential from C4 at back contacts 401, 402; and also causes a ringing voltage to be applied to bell B400 at called station 4.

Means for supplying an intermittent alternating ringing voltage to ringing conductor W3 is shown in Fig. 4. This means includes ring start relay 430 and differentially-wound ringing interrupter relay 440, together with a suitable source of alternating current power. Action of the ringing generator is initiated by the placing of (−) on conductor W3. The circuit for doing this extends from (−), conductor B2, step magnet 410, resistor R402, back contacts 422 and 421 of hold relay 420, and front contacts 405 and 406 of relay 400 to W3.

The placing of (−) on ringing conductor W3 causes the operation of start relay 430 over a circuit extending from W3 through R404, winding of relay 430, rectifier X400, secondary of transformer T401, to (+) on W4. Transformer T401 has its leads W401 and W402 connected to a suitable source of alternating potential, not shown. Alternating ringing voltage therefore appears across the secondary winding of transformer T401.

The operation of relay 430 causes the application of voltage from the secondary of T401 to ringer B400 at substation 4. This circuit may be traced from (+), secondary of T401, back contacts 441 and 442 of relay 440, make contacts 431 and 432 of relay 430, ring conductor W3, make contacts 406 and 405 of connect relay 400, back contacts 421 and 422 of hold relay 420, capacitor C403, bell B400 to (+) on W4. Bell B400 may be shunted as shown by gaseous discharge device V400, which is preferably a neon lamp visible to persons near station 4. V400 is conveniently mounted in the cradle base, if used, for telephone instruments R400 and T401, or else in the transmitter support if a separate receiver type of substation is used. The resonant voltage built up across B400 during ringing is sufficient to ignite V400 and thereby to provide a visual as well as audible call signal means.

Capacitor C406 normally stands charged by a circuit extending from (−), winding 446 of relay 440, upper winding 445 of relay 440, capacitor C406 to (+). Since no current flows under this condition, relay 440 remains unactuated. When relay 430 operates as described above, however, a discharge path is established for C406. This path extends from upper winding 445 of relay 440, break contacts 443 and 442 of relay 440, make contacts 433 and 434 of relay 430, capacitor C406 to the upper winding 445 of relay 440. Winding 446 is then energized over a path extending from (−), lower winding 446, break contacts 443, 444 and make contacts 433, 434 to (+).

When capacitor C406 is sufficiently discharged, the flux resulting from current flow through the upper winding 445 of relay 440 diminishes to the point where the flux due to lower winding 446 attracts its armature. The actuation of relay 440 breaks the above-traced ringing circuit at break contacts 441 and 442. The discharge circuit for capacitor C406 is likewise broken at break contacts 443, 444. C406 thereupon begins recharging through both windings of 440 in series, as set forth above. Relay 440 continues operated until the charging current through the windings of relay 440 in series generates sufficient flux to attract its armature. Relay 440 thereupon releases, and reestablishes the ringing circuit at its break contacts 441, 442. The ringing cycle thereupon repeats intermittently until the call is answered. It can be understood by those skilled in the art, of course, that other types of ringing interrupters may be employed in our invention, and that a suitable source of direct current may be substituted for the A.-C. source mentioned, if D.-C. ringers are used at the substations.

During the ringing operation, the calling party at station 3 hears ringback tone derived from the ringing voltage applied to station 4. This circuit starts at the junction of capacitors C403 and C402 and continues through capacitor C402, talk bank conductor T4, contact spring 312, make contacts 303 and 304 of relay 300, make contacts 326 and 327 of relay 320, primary of transformer T300, transmitter T301, hookswitch contacts S302 and S303 to (+). In this way a portion of the voltage appearing across ringer B400 is heard in receiver R300, being picked up from the secondary of transformer T300.

When the party at the called station 4 answers the call by removing his receiver from its hook, hold relay 420 is operated over a circuit extending from (−), winding of relay 420, primary of transformer T400, transmitter T401, contacts S402 and S403 to (+). Relay 420 breaks the ringing voltage circuit to bell B400 at contacts 421 and 422. Furthermore, (−) is removed from ringing bus W3 at the same contacts to cause the release of relay 430 and hence to stop the ringing generator operation. Hold relay 420 also establishes a circuit for locally holding connect magnet 400 operated through step magnet winding 410 over a circuit extending from (−), winding of stop magnet 410, make contacts 408 and 409 of relay 400, winding of relay 400, make contacts 426 and 427, primary of transformer T400, transmitter T401, contacts S402 and S403 to (+). A talking connection between stations 3 and 4 now extends from (+), hookswitch contacts S303 and S302, transmitter T301, primary of transformer T300, make contacts 326 and 327 of relay 320, conductor T4, contact spring 412, make contacts 403, 404 of relay 400, make contacts 426 and 427 of relay 420, primary of transformer T400, transmitter T401, hookswitch contacts S402 and S403 to (+).

At the conclusion of the conversation, relays 300, 320, 400 and 420 remain operated until the last party has hung up. Thus, if the first party to hang up is at station 4, (+) is removed from the local holding circuit by the opening of hookswitch contacts S402 and S403. Relays 400 and 420 do not release, however, because they are held by (+) on conductor T4 coming from (+), conductor W4, S303, S302, T301, primary of transformer T300, make contacts 326 and 327 and hold relay 320, make contacts 303 and 304 of connect relay 300 and contact spring 312 to conductor T4. Connect relay 400 is locked to conductor T4 by a circuit extending from (−), winding of step magnet 410, make contacts 408 and 409, break contacts 413 and 414 of step magnet 410, and winding of relay 400 to T4. Relay 420 remains operated over a circuit extending from (−), winding of relay 420, make contacts 426 and 427 of relay 420 to T4. Relays 300 and 320 remain operated from (+) at station 3, as set forth previously.

When the party at station 3 hangs up, the (+) potential holding relays 300, 320, 400 and 420 is broken at cradle switch contacts S302 and S303, thereby restoring these relays to their normal, or de-energized condition. When hold relay 320 releases, contact springs 311 and 312 fall back to their home, or disengaged, position. If the party at station 3 hangs up first, the relays are held from (+) at station 4 until the party at station 4 hangs up. Since both stations and their selectors have functionally identical circuitry, it is believed unnecessary to reiterate the sequence of release steps.

It is a feature of our invention that a calling party, upon finding a called party's line to be busy, may refrain from hanging up if he desires. When the established conversation ends and the parties hang up, ringing at the called station will automatically start as soon as the connect and hold magnets of the called party's selector have restored to their normal, or de-energized, condition. This occurs in a few milliseconds, and hence the ringing is generally regarded as instantaneous.

It is advantageous according to our invention to reserve lines 9, 19, 29, 39, etc., as "resting" places for the contact springs of the selectors in the system, and not to assign any station to these lines. These lines thus have no potentials whatsoever standing on them. If it is desired to dial, say, line 15, the directory number would be 96. A calling party would thus dial 9, and his selector contact springs would stand on line 9 at the end of the first digit. No further action would occur until dialing of the next digit, 6, at which time the switch would step to the desired fifteenth line.

*Voice paging*

An optional feature of our invention illustrated in Fig. 5 allows voice paging to be substituted for ringers. A voice paging system is valuable where the telephones on a party line are located within hearing distance of each other, as in a large office room.

When the calling party has dialed the number of the called party, and hears neither busy tone nor ringback tone, he knows that he has dialed into a voice paging line. He thereupon announces the name of the person to whom he wishes to speak, and this information is amplified and reproduced on a loudspeaker in the area where the called party telephone or telephones are located. The called party may then answer the telephone, or any one of the telephones on a party line, if he is present, or someone else nearby may likewise answer to tell the calling party that the desired person is not available.

In the exampled embodiment of Fig. 5, two party line stations are shown. The first of these comprises transmitter T501, transformer T500, receiver R500, dial D501, and hookswitch contacts S501 and S502. The second station may comprise identical equipment, namely, transmitter T503, transformer T502, receiver R503, dial D502 and hookswitch contacts S503 and S504.

If station 5 is idle when another station, say station 3, calls, the calling telephone is connected directly to amplifier A500 which in turn feeds loudspeaker L500. The circuit accomplishing this extends from (+), contacts S303 and S302, transmitter T301, primary of transformer T300, make contacts 326 and 327 of hold relay 320, make contacts 303 and 304 of connect relay 300, contact spring 312 of stepping magnet 310, talk conductor T5, capacitor C503, amplifier A500 to (+) on W4. Relay 530 is operated over this circuit also, the (+) potential present on conductor T5 being connected through the windings of relays 530 and 520 in series to (−). We prefer that back-to-back rectifier X500 be connected across the winding of relay 530 to prevent surges. Relay 530 has a higher resistance than relay 520, and consequently only the former operates to open its contacts 531, 532 and so to remove an obvious shortcircuit from the input of amplifier A500. The connection is maintained, and the calling party may continue to page the party he desires over loudspeaker L500, until the page is answered.

Upon removal of one of the party line telephones from its hookswitch, holding relay 520 is operated. Assuming that the handset including R500 is lifted to answer the call, the circuit for relay 520 extends from (−), winding of relay 520, primary of transformer T500, transmitter T501 and contacts S501 and S502 to (+). Upon operation, relay 520 closes its contacts 526 and 527 to establish an obvious shortcircuiting path for relay 530 and so to cause release of the latter. Upon its release, relay 530 closes its back contacts 531 and 532 to shortcircuit the input circuit of amplifier A500.

*Conference calls*

Either or both of two types of conference arrangements are possible in a given telephone installation according to our invention. In the first, usually known as a common conference facility, parties who have previously arranged to confer may dial a special conference number. In the circuit shown, conductors T8 and C8 may be reserved for conference use, and in that case have no station assigned to them. Conductor C8 is connected directly to conductor W2, and therefore has (−) potential standing on it at all times. Since the presence of (−) indicates an idle line to each selector circuit, each selector circuit will immediately cut through when its stepping contacts reach conductor C8. When the parties to the conference have each set their selector switches in the eighth position, conversation may take place over talk conductor T8.

Those skilled in the art will appreciate that any other line may be used to carry on a conference of the first type, and in fact more than one line may be assigned for this purpose merely by strapping it to (−).

A party desiring to break out of a conference and establish another call may do so by dialing any digit. If a random digit is chosen for breaking-out purposes, however, an idle station may be reached, thereby initiating ringing. To avoid this annoyance, it is advantageous in accordance with our invention to assign line 8 for conference purposes of this type, as shown in Figs. 3–5, and instructing the users to dial "1" if they desire to break out of a conference. Since line 9 is a blank line, no annoyance is caused through possible inadvertent ringing of an idle station.

A second method of holding a conference is the so-called progressive conference, in which the first party calls the second, the second the third, and so on. Thus, in the above exampled call in which station 3 called station 4, it may be desired to confer with a party at station 5. In this case, the party at station 4 merely dials five pulses. At the start of the first dial pulse, relay 400 is dropped out because stepping magnet 410 is energized directly over a circuit extending from (−), winding of 410, make contacts 423 and 422, resistor R402, dial D401, contacts S402 and S403 to (+). The circuit for energizing relay 400 is also broken at break contacts 413 and 414 of relay 410. Station 4 is therefore prevented from automatically cutting in on station 5 if the latter should happen to be busy.

If station 5 is busy, its connect magnet 500 is operated, leaving back contacts 501, 502 opened. No further action can then occur. On the other hand, if station 5 is idle and relay 500 is consequently de-energized, connect magnet 400 is therefore reoperated when stepping magnet 410 is de-energized at the end of station 5's digit. The circuit for doing this extends from (−), busy tone generator 330, busy tone conductor W1, contacts 501 and 502, control bank conductor C5, contact spring 411, back contacts 407, 408, break contacts 414 and 413 of step magnet 410, winding of connect magnet 400, make contacts 426 and 427 of hold magnet 420, primary of transformer T400, transmitter T401, contacts S402 and S403 to (+).

Upon operation, relay 400 relocks to its holding circuit, the latter extending from (−), winding of step magnet 410, make contacts 408, 409, break contacts 414, 413 of relay 400, winding of connect magnet 400, make contacts 426 and 427 of hold relay 420, primary of transformer T400, transmitter T401, and contacts S402 and S403 to (+).

Since station 5 is of the voice paging type, the person calling from station 4 hears no ringback tone and is thus apprised of the fact that 5 is a voice paging station. He therefore announces the name of the person whom he wishes to have join the conference. The operation of the voice paging proceeds as set forth above.

*Executive right-of-way*

We may provide means, in accordance with our invention, for permitting a station to cut in at will on a conversation in progress. This is sometimes termed executive right-of-way. We have illustrated station 3 as being provided with this feature.

Suppose station 4 has called station 5 and conversation is under way. If a calling party at station 3 calls station 4, he will receive busy signal as already outlined. However, if his call is urgent, he may momentarily close switch S304, which is most conveniently of the push-button type. During the time switch S304 is closed, busy signal is fed to stations 3, 4 and 5 to give warning that the conversation is being intruded upon. After switch S304 is opened, busy tone ceases and the calling party at Fig. 3 may talk with both stations 4 and 5. The usual procedure is for the calling party at station 3 to request the party at station 5 to hang up so that he may talk alone with the party at station 4.

When switch S304 is closed, busy tone reaches station 4 over a circuit extending from (−), busy tone generator 330, busy tone conductor W1, switch S304, capacitor C301, make contacts 304 and 303 of relay 300, contact spring 312 of stepping magnet 310, talk conductor T4, make contacts 426 and 427 of hold relay 420, primary of transformer T400, transmitter T401, and contacts S402 and S403 to (+). Receiver R400 picks up the tone from the secondary of transformer T400.

Busy tone is extended from station 4 to station 5 over a path extending from talk bank conductor T4, make contacts 404 and 403, contact spring 412 of step magnet 410, talk bank conductor T5, make contacts 526 and 527 of operated hold magnet 520 through the primary of T502 if R503 is the substation set in use, T503, contacts S503 and S504 to (+). Receiver R503 picks up the tone from the secondary of transformer T502. If receiver R500 were in use instead of receiver R503, the busy tone would be heard therein, in similar fashion, since two substations are in parallel. Upon release of switch S304, the above-traced busy tone circuits are broken at the switch contacts.

Closure of switch S304, in addition to causing busy tone to be heard by the engaged parties, operates connect relay 300 over a circuit extending from (−), busy generator 330, conductor W1, switch S304, winding of connect magnet 300, make contacts 326 and 327, primary of transformer T300, transmitter T301, and contacts S302 and S303 to (+). Thus, closure of switch S304 is the equivalent of a call being answered at a called station, because connect relay 300 operates just as it would if a normal call to an idle station were answered.

The operation of connect relay 300 establishes a connection between the transmitter and receiver at station 3 and the talk conductor of the called station, this circuit extending from (+), contacts S302 and S303, transmitter T301, primary of transformer T300, make contacts 326 and 327 of hold relay 320, make contacts 303 and 304 of connect relay 300 and contact spring 312 to conductor T4. Conversation may then proceed at will. If it is not necessary that busy tone be applied as a warning signal to persons already carrying on a conversation that their conversation is about to be broken in upon, switch S304 may be returned directly to (−), on conductor W2 instead of to busy tone conductor W1.

While we have shown and described our invention as applied to a specific embodiment thereof, other modifications will readily occur to those skilled in the art. We do not, therefore, desire our invention to be limited to the specific arrangement shown and described, and we intend in the appended claims to cover all modifications within the spirit and scope of our invention.

What we claim is:

1. In an automatic telephone system, the combination of a calling station having telephone instrument and switch directive means; a called station having a telephone instrument; a source of ringing voltage; a source of busy signal; switching means individually associated with each of said calling and called stations, a talking and a control conductor connected between the switching means of said calling and said called stations; means for continuously connecting said source of busy signal to said control conductor, said calling station switching means including means responsive to the initiation of a call at said calling station and manipulation of said switch directive means thereat for immediately supplying busy signal to said telephone instrument of said calling station over said control circuit and for simultaneously testing the idle condition of said called station; said calling station switch means including means responsive to said test showing said called station to be idle for removing said busy signal from the telephone instrument of said calling station and for extending a talking circuit from said telephone instrument of said calling station to said talking conductor, said called station switching means including means responsive to said extension of said talking circuit to said called station switching means for causing the application of voltage from said ringing voltage source to said telephone instrument of said called station and for preparing a connection between said talking conductor and said telephone instrument of said calling station, said called station switching means being means responsive to the answering of said call at said called station for removing said ringing voltage from said telephone instrument of said called station and for completing said prepared connection between said talking conductor and said telephone instrument of said called station.

2. In an automatic telephone system, the combination of a calling station, switch directive means at said calling station; a called station; call signal means at said called station; a selector individual to and connected with said calling station; a selector individual to and connected with said called station; said calling station selector having switch means including movable contacts connected to said calling station and fixed contacts connected to said called station selector, said called station selector including relay means; a source of signal voltage; a source of busy signal; means responsive to the initiation of a call and manipulation of said switch directive means at said calling station for causing the operation of said switch means until said movable contacts engage said fixed contacts; means responsive to the engagement of said movable contacts with said fixed contacts for simultaneously testing the idle condition of said called station and for supplying busy signal from said source of busy signals to said calling station said last-named means being responsive to said test showing said called station to be idle for removing said busy tone from said calling station and for causing the operation of said relay means; means responsive to the operation of said relay means for causing the application of voltage from said signal voltage source to said call signal means at said called station; and means responsive to the answering of said call at said called station for removing said voltage from said call signal means.

3. In an automatic telephone system, the combination of a calling station; switch directive means at said calling station; a called station; call signal means at said called station; a plurality of selectors respectively connected to corresponding ones of said stations, each of said selectors having a connect relay and selective switch means, each said selective switch means including a step magnet, a hold relay, movable contacts, and fixed contacts connected to said called station; means for operating said hold relay of said calling station selector upon initiation of a call at said calling station; means for operating said step magnet in response to actuation of said switch directive means at said calling station until said movable contacts engage said fixed contacts; a source of busy signal; means for coupling said source to said fixed contacts of said selector; said connect relay of said calling station being responsive to said engagement with said fixed contacts for simultaneously supplying busy signal from said fixed contacts to said calling station and for testing the idle condition of said called station; said connect relay of said calling station being operative in response to a test showing said called station to be idle for operating said connect relay of said called station selector and for removing said busy signal from said calling station; means for causing the operation of said call signal means at said called station in response to the operation of said connect relay of said called station; means responsive to the answering of said call at said called station for operating said hold relay of said called station selector; and means responsive to the operation of said hold relay for stopping said operation of said called signal means.

4. The combination of claim 3 in which said fixed contacts include talk bank conductors and control bank conductors, and said movable contacts include first and second wipers respectively associated with said talk bank and control bank conductors, and in which said idle test is carried out over said control bank conductors, and said busy signal is supplied over said control bank conductors.

5. The combination of claim 3 in which said means for operating said call signal means at said called station includes a source of alternating current, and in which said call signal means is of the type operable by alternating current.

6. The combination of claim 5 in which said call signal means at said called station includes a telephone ringer operable from said source and a gaseous discharge device capable of ignition from the voltage of said source.

7. The combination of claim 6 in which said ringer and said discharge device are connected in parallel.

8. The combination of claim 3 in which said step magnets operate only in response to a current of greater than a predetermined magnitude and said means for operating said connect relay of said called station includes the step magnet of said called station and means for energizing said connect and step magnets in series with a current of less than said predetermined magnitude whereby said step magnet of said called station does not operate when said corresponding connect relay operates.

9. The combination of claim 3 to which is added means at said calling station for causing said connect relay at said calling station selector to operate despite an idle test showing said called station to be busy, and thereby to establish a talking connection between said calling station and said busy called station.

10. The combination of claim 9 to which is added means for supplying a warning signal to said called station that said calling station is intruding on said busy called station.

11. In an automatic telephone system, the combination of a calling station; telephone instruments and switch directive means at said calling station; a party line; a plurality of party stations on said party line; telephone instruments at each of said party stations; a loudspeaking telephone audible at said party stations; a selector individual to said calling station; a selector individual to said party line; each of said selectors having a connect relay and selective switch means, each said selective switch means including a step magnet, a hold relay, movable contacts, and fixed contacts connected to said party line; means for operating said hold relay of said calling station selector upon initiation of a call at said calling station; means for operating said step magnet in response to actuation of said switch directive means at said calling station until said movable contacts engage said fixed contacts; a source of busy signal; means responsive to said engagement for supplying busy signal from said source to said calling station; means for testing the idle condition of said party stations; said connect relay of said calling station being operative in response to a test showing said party stations to be idle for operating said connect relay of said called station selector and for removing said busy signal from said calling station; means responsive to the operation of said connect relay of said party line selector for connecting said calling station to said loudspeaking telephone; means responsive to the answering of said call at any one of said party line stations for operating said hold relay of said party line station's selector; and means responsive to the operation of said hold relay for removing said loudspeaking telephone from the circuit of said calling station and for establishing a talking connection between said calling station and the answered one of said party line stations.

12. The combination of claim 11 having amplifying means the output of which is connected to said loudspeaking telephone, the input of said amplifying means being fed from said calling station.

13. In an automatic telephone system, the combination of a calling station; telephone instruments and switch directing means at said calling station; a called station; telephone instruments and call signal means at said called station; a source of signal voltage; a source of busy signal; switch means individual to said calling station; means connecting said stations to said switch means; means responsive to the initiation of a call at said calling station and the manipulation of said switch directing means thereat for directing a connection from said calling station to said called station; means responsive to said direction for supplying busy signal to said calling station and for testing the idle condition of said called line; means responsive to a said test showing said called station not to be idle for continuing to supply busy signal to said calling line and for continuing said idle test; means responsive to said called station becoming idle for causing said idle test means to remove busy signal from said calling station and to apply voltage from said signal voltage source to said call signal means at said called station; and means responsive to the answering of said call at said called station for removing said voltage from said call signal means and for completing said directive connection between said calling and said called stations.

14. In an automatic telephone system, the combination of first, second and third stations, each set of said stations having telephone instruments, call signal means, and switch directing means thereat; first and second and third selectors respectively connected to said first, second and third stations; means including said first and second selectors for establishing a talking connection between said first and second stations; a source of busy signal; a source of signal voltage; means responsive to the manipulation of said switch directing means at said second station for directing a connection from said established talking connection to said third station; means responsive to said direction for supplying busy signal to said first and second stations and for testing the idle condition of said third station; means responsive to said test showing said third station to be idle for removing said busy signal from said first and second stations and for causing the application of voltage from said signal voltage source to said call signal means at said third station; and means responsive to the answering of said call at said third station for removing said voltage from said call signal means at said third station and for completing said directive connection to establish a common talking connection among said first, second and third stations.

15. In an automatic telephone system, the combination of first, second and third stations, each of said stations having telephone instruments, call signal means and switch directive means thereat; first, second and third selectors respectively connected to said first, second and third stations; each said selector including selective switch means having a set of movable contacts and at least first, second and third sets of fixed contacts, said first, second and third sets of fixed contacts being respectively connected to said first, second and third selectors; a source of signal voltage; means including said first and second selectors for establishing a talking connection between said first and second stations; means effective during an established talking connection between said first and second stations and in response to the manipulation of said switch directing means at said second station for causing said movable contacts at said second station selective switch means to engage said fixed contacts connected to said third station; means responsive to said engagement for applying signal voltage to said call signal means at said third station; and means responsive to the answering of said call at said third station for removing said voltage from said third station call signal means and for establishing a talking connection from said third station to said first and second stations.

16. In an automatic telephone system, the combination of a plurality of stations, each said station having telephone instruments and switch directive means thereat; a plurality of selectors respectively connected to corresponding ones of said stations, each of said selectors having selective switch means, said selective switch means each having at least one movable contact and at least one fixed contact, each said fixed contact being connected to a corresponding one of said selectors, each of said selective switch means having an additional fixed contact accessible to said movable contact; means responsive to the initiation of a call at any one of said stations or the manipulation of said switch directive means thereat for establishing a connection with any idle one of said stations; and means responsive to the initiation of a conference call at any one of said stations and the manipulation of said switch directive means thereat such that said movable contacts in the corresponding said selector engages said additional fixed contact for establishing a talking connection between said conference-calling station and any other of said stations likewise initiating a conference call or the manipulation of said switch directive means thereat such that the movable contact of the corresponding said selector engages said additional fixed contact thereof.

17. In an automatic telephone system, the combination of a plurality of stations each having telephonic instruments and switch directive means thereat; a plurality of selectors respectively connected to corresponding ones of said stations, each of said selectors having a connect relay and selective switch means; each of said selective switch means including a step magnet, a hold relay, a movable contact and a fixed contact connected to corresponding ones of said stations and an additional fixed contact; means responsive to the initiation of a conference call at one of said stations and the manipulation of said switch directive means thereat such that said movable contact in the corresponding said selector engages said additional fixed contact for operating said connect relay; and means responsive to the operation of said connect relay for establishing a talking connection between said one conference-calling station and any other station likewise initiating a conference call and manipulating a movable contact in a corresponding said selector into engagement with a corresponding said additional fixed contact.

18. In a telephone system, a plurality of stations, switching means individually associated with each of said stations, means at each of said stations for transmitting switch directing signals to the switching means associated with that station, means in each of said switching means responsive to the initiation of a call by the associated station and the receipt of switch directing signals corresponding to an idle station for extending a talking circuit from the calling station to the switching means associated with the called station, a source of ringing voltage at said called station, the called station switching means including means responsive to said extension of said talking circuit to said called station switching means for connecting said source of ringing voltage to said called station.

19. The combination of claim 18 in which said last-named means includes a source of alternating current and said source of ringing current is of the type operable by alternating current.

20. The combination of claim 19 in which said source of ringing current includes a telephone ringer operable from said source, and a gaseous discharge device capable of ignition from the voltage of said source.

21. In a telephone system, a plurality of stations, switching means individually associated with each of said stations, means at each of said station for transmitting switch directing signals to the switching means associated with that station, means in each of said switching means responsive to the initiation of a call by the associated station and the receipt of switch directing signals corresponding to an idle station for extending a talking circuit from the calling station to the switching means associated with the called station, and a source of ringing voltage at said called station, the called station switching means including means responsive to said extension of said talking circuit to said called station switching means for connecting said source of ringing voltage to said called station, said called station switching means including means responsive to an answering operation performed thereat for disconnecting said source of ringing from said called station.

22. In a telephone system, a plurality of stations, switching means individually associated with each of said stations, means at each of said stations for transmitting switch directing signals to the switching means associated with that station, means in each of said switching means responsive to the initiation of a call by the associated station and the receipt of switch directing signals correspondng to an idle station for extending a talking circuit from the calling station to the switching means associated with the called station, and a source of ringing voltage at said called station, the called station switching means including means responsive to said extension of said talking circuit to said called station switching means for connecting said source of ringing voltage to said called station and for preparing a connection between said extended talking circuit and said called station, and means in said called station switching means responsive to an answering operation performed thereat for disconnecting said source of ringing from said called station and for completing said prepared connection to said called station.

23. In a telephone system, a plurality of stations, switching means individually associated with each of said stations, each of said switching means having a first wiper and a tank of control conductors individually corresponding to said stations, means in each of said switching means responsive to the initiation of a call and the receipt of switch directing signals from its associated station corresponding to a called station for controlling said first wiper to engage the conductor of said control bank corresponding to the called station and for connecting said first wiper to the calling station, a source of busy tone, means for continuously connecting said source to all of the conductors of said control bank, a source of potential, means in each of said switching means for connecting said source of potential to the control conductor individually corresponding to that station only when it is idle, said switching means of each of said stations including a bank of talk conductors individually corresponding to said stations and a second wiper, said second wiper being responsive to said means for controlling the first wiper for engaging the conductor of said talk bank corresponding to the called station, means in the calling station switching means responsive to the application of said potential to its first wiper for breaking said connection between said first wiper and the calling station and for connecting said second wiper to said calling station whereby the busy tone is disconnected from the calling station when the called station is idle and a talking circuit is extended from said calling station through said second wiper and the talk conductor corresponding to the called station to the switch means of the called station.

24. The combination of claim 23 in which said called station has a source of ringing voltage, and means in said called station switching means responsive to the connection of the calling station to the conductor of the talk bank individually corresponding to said called station via said second wiper for connecting said source of ringing voltage to said called station.

25. The combination of claim 24 in which said switching means of said called station includes means responsive to the connection of the calling station to the conductor of the talk bank corresponding to the called station via said second wiper for preparing a connection between such conductor and said called station.

26. The combination of claim 25 in which said switching means of said called station includes means responsive to an answering operation at the called station for disconnecting said source of ringing voltage from said called station and for completing said prepared connection.

References Cited in the file of this patent

UNITED STATES PATENTS

| | | |
|---|---|---|
| 1,334,447 | Goodrum | Mar. 23, 1920 |
| 1,609,298 | Jacobsen | Sept. 23, 1924 |
| 1,679,567 | Gardner | Aug. 7, 1928 |
| 1,799,532 | Ray et al. | Apr. 7, 1931 |
| 2,298,207 | Gent | Oct. 6, 1942 |
| 2,303,015 | Beaumont | Nov. 24, 1942 |
| 2,346,548 | Atkins | Apr. 11, 1944 |
| 2,629,022 | Wall | Feb. 17, 1953 |

UNITED STATES PATENT OFFICE

CERTIFICATE OF CORRECTION

Patent No. 2,927,970 March 8, 1960

Angus W. Blow et al.

It is hereby certified that error appears in the printed specification of the above numbered patent requiring correction and that the said Letters Patent should read as corrected below.

Column 11, line 11, after "for" insert -- extending a control circuit from said telephone instrument of said calling station to said control conductor for --; column 15, line 53, for "tank" read -- bank --.

Signed and sealed this 8th day of November 1960.

(SEAL)
Attest:

KARL H. AXLINE
Attesting Officer

ROBERT C. WATSON
Commissioner of Patents